Sept. 12, 1961   W. BEUKEMA ET AL   2,999,302
APPLYING LEADS TO TUBULAR ELECTRICAL COMPONENTS
Filed Oct. 29, 1956

INVENTORS.
WILLEM BEUKEMA
BERNARD HENDRIK BRUIJNING
BY JOHANNES VUURMANS.

AGENT

United States Patent Office 2,999,302
Patented Sept. 12, 1961

2,999,302
APPLYING LEADS TO TUBULAR ELECTRICAL COMPONENTS
Willem Beukema, Bernard Hendrik Bruijning, and Johannes Vuurmans, Eindhoven, Netherlands, assignors, by mesne assignments, to North American Philips Company, Inc., New York, N.Y., a corporation of Delaware
Filed Oct. 29, 1956, Ser. No. 618,887
Claims priority, application Netherlands Nov. 5, 1955
5 Claims. (Cl. 29—155.5)

Our invention relates to a method of applying leads to electrical components, particularly capacitors and resistors and capacitors, to be manufactured in ever smaller conductive material provided with metal coatings on the inner and outer surfaces.

New techniques and the use of new materials enable tubular metal-coated electrical components, such as resistors and capacitors, to be manufactured in ever emaller sizes. This miniaturization is highly desirable with a view to the use of such components in hearing aids, portable radio apparatus and many other electrical and electronic apparatus which must have a small volume and if possible, a low weight.

As the sizes of such components are reduced, the available surface area of the coatings for the attachment of the connecting leads is decreased. Consequently, in such miniature components the attachment of the connecting leads in the manner which is usual for larger components gives rise to difficulty.

It is an object of the invention to provide a method which enables the connecting leads to be provided in a simple manner which is highly suited to mechanization, particularly when the metal-coated tubes are small.

According to the invention, the tube is slipped on one limb of a length of wire bent into the shape of a hairpin and is clamped between the limbs of the hairpin at a slight distance from the bend or bight, each limb engaging a metal coating. Then the wire parts are joined to the coatings by dip-soldering. In this process the body is supported by the wire, the wire being subsequently cut through between the joints to the various coatings. The cutting operation may be effected when the component is mounted.

The method in accordance with the invention is highly suited for use with ceramic miniature capacitors, the bodies of which comprise a ceramic tube only a few mms. in length which is provided internally and externally with a metal coating, the end faces being kept clear. Such tubes can be obtained by a simple method in which a comparatively long ceramic tube is metalized internally and externally, is incised at points spaced by distances corresponding to the length of the required capacitors and subsequently is broken at these points. When modern materials having a high dielectric constant are used, the proportions for capacitance values of from one to a few hundred micromicrofarads are very small, unless the tube is given an abnormally great wall-thickness or the required capacitance value is obtained by a series arrangement of at least two capacitors which each comprise one part of the body. Such a makeshift solution can be avoided by the use of the method in accordance with the invention.

According to one embodiment of our method which is particularly suited to mass production, a number of the tubular bodies, for instance ceramic tubes metalized on their inner and outer surfaces, are arranged on a continuous wire. The wire is then wound on two parallel arranged supporting rods in a manner such that one half of each turn passes through a tube and the other half engages the outer surface of a tube. The wire parts concerned are subsequently joined to the internal and external metal coatings of the tubes by dipsoldering.

The invention will now be described more fully with reference to the accompanying drawing, in which:

FIG. 1 is a perspective view of a tubular capacitor provided with connecting leads by the method of the invention, FIG. 2 is a longitudinal cross-sectional view of a tubular capacitor, in which the connecting leads, which still form an integral structure, are shaped in a slightly different form, FIG. 3 is a cross-sectional view taken along the line III—III of FIG. 2, FIG. 4 is a side view of a finished capacitor of the kind shown in FIGURES 2 and 3, FIG. 5 illustrates a method of providing connecting leads to tubular bodies which is suited to mechanization.

Referring now to FIG. 1, reference numeral 1 denotes a tube of ceramic material, the length of which is at the most a few mms. and the overall diameter of which is about 3 mms. The inner wall of the tube is provided with a metal coating 2 and its outer wall is provided with a metal coating 3. The two coatings extend to the ends of the tube 1 and may be produced by firing silver to the tube. According to the invention, such a tube is provided with connecting leads in that a wire 4 is wound on the tube with one turn and, by way of a loop 5, one end 6 of the wire is passed through the tube 1. The tube 1 may then be supported from the end 6 of the wire 4 and is dipped bight first into liquid solder. It has been found that if the end faces of the tube are clean, as will be the case if the tube has been produced by breaking an internally and externally metallized longer tube, during the dipping process no solder bridge between the inner coating and the outer coating is produced. After solidification of the solder, the loop 5 is cut through. Alternatively the entire loop may be removed by cutting the wire at two points on either side of the loop.

FIGS. 2 and 3 show an annular member 20 made of ceramic material and provided internally and externally with metal coatings 21 and 22 respectively. The annular member 20 is slipped on one limb 23 of a wire 24 which is bent into the form of a hair-pin. The wire 24 is bent so that the other limb 25 engages the outer coating 22, a loop 26 being produced below the annular member. Thus, the member 20 does not bear upon the bight portion of the hairpin-shaped wire 24, but is gripped by the spring action of the two limbs 23 and 25. The assembly is taken hold of by the end of one or both limbs and dipped bight first into liquid solder, so that the limb 23 is soldered to the coating 21 and the limb 25 is soldered to the coating 22 (FIG. 3). Since the member 20 does not bear upon the end portion of the loop 26, no bridge of solder can be formed between the two coatings 21 and 22. The wire 24 can then be cut through at points A and B (FIG. 2), in which case the connecting leads consisting of the remaining parts of the two limbs 23 and 25 extend in the same direction. Obviously the wire may also be cut through at points C and B, so that when the loop 26 is straightened, a capacitor is produced having leads which extend from opposite end surfaces. When the wire has been cut through, the capacitor may be provided with an insulating envelope 40 (FIG. 4) by dipping it in a liquid insulating material or lacquer.

FIG. 5 illustrates an embodiment of the method according to the invention, in which a number of ceramic tubes or rings provided with metal coatings on the inner and outer surfaces, are simultaneously provided with connecting leads. A number of such tubes 51 are strung on a wire 50 which is wound on two parallel arranged supporting rods 52 and 53, so that one half 55 of each winding passes through a tube and engages the coating on its inner wall, while the other half 57 is arranged outside the tube and engages its outer coating 58. The system so produced is subsequently dipped in liquid solder at least up to about the line d—d, so that the halves of the wire turns are joined to the associated coatings. If the assembly is dipped deeply into the solder, the wire turns are not only joined to the lower rod 53, but also to the upper rod 52, which may have advantages for further treatment.

After solidification of the solder, all the turn halves 55 and 57 are cut through along the line e—e, which, as will be seen from FIG. 5, runs close past the lower surfaces of the tubes 51. If required, all the tubes are subsequently washed in a solvent and dipped in a liquid insulating lacquer. Then either all the turn halves 55 or all the turn halves 57 are cut through along the line f—f. Then each capacitor can be measured separately by connecting one terminal of a measuring device to the rod 52 and the other terminal, in sequence, to the remaining parts of the turn halves cut through along the line f—f which are joined to the tubes 51. Then all the other turn halves are also cut through, so that all the capacitors become detached from the supporting rod 52.

When carrying out the method of the invention, it is not necessary for the wire joined to various coatings by dip-soldering to be cut through immediately after the soldering process. This cutting may be performed only when the components concerned must be mounted in an apparatus or device. Particularly when using the methods illustrated in FIGURE 4, it may be of advantage for the components to be left attached to the supporting rod 52 for the time being by at least one length of wire, so that simultaneous packaging and shipping of a number of such components is facilitated. The required number of components may be cut off as desired and taking inventory is also facilitated.

What is claimed is:

1. A method of forming leads on an electrical component in a form of a tubular insulating body having metal coatings at the inner and outer surfaces, comprising the steps of arranging a hairpin-shaped elongated conductor with the bight spaced from one end surface of the body, with one leg extending through the bore of the body in contact with the inner coating and some distance beyond the other end surface, and with the second leg extending in contact with the outer coating and some distance beyond the said other end surface; dipping the assembly bight first into liquid solder while maintaining the body in a supported position spaced above the bight to thereby solder the legs to the respective metal coatings; and severing at least the bight portion to divide the conductor into two separate leads each connected to one of said coatings and extending from at least one end of the body.

2. A method of forming leads on an electrical component in a form of a tubular insulating body having metal coatings at the inner and outer surfaces, comprising the steps of arranging a hairpin-shaped elongated conductor with the bight spaced from one end surface of the body, with one leg extending through the bore of the body in contact with the inner coating and some distance beyond the other end surface, and with the second leg extending in contact with the outer metal coating and some distance beyond the said other end surface; dipping the assembly bight first into liquid solder while maintaining the body in a supported position spaced above the bight to thereby solder the legs to the respective metal coatings; severing one leg at a point near said first end surface to divide the conductor into two separate leads; and straightening the bight.

3. A method of forming leads on an electrical component in a form of a tubular insulating body having metal coatings at the inner and outer surfaces, comprising the steps of arranging a hairpin-shaped elongated conductor with the bight spaced from one end surface of the body, with one leg extending through the bore of the body in contact with the inner coating and some distance beyond the other end surface, and with the second leg extending in contact with the outer coating and some distance beyond the said other end surface; dipping the assembly bight first into liquid solder while maintaining the body in a supported position spaced above the bight to thereby solder the legs to the respective metal coatings; and severing both legs at points adjacent said first end surface to thereby remove the bight portion and divide the conductor into two separate leads each extending from said other end surface.

4. A method of forming leads on an electrical component in a form of a tubular insulating body having metal coatings at the inner and outer surfaces, comprising the steps of arranging a hairpin-shaped elongated conductor with the bight spaced from one end surface of the body, with one leg extending through the bore of the body in contact with the inner coating and some distance beyond the other end surface, and with the second leg extending in contact with the outer coating and some distance beyond the said other end surface; dipping the assembly bight first into liquid solder while maintaining the body in a supported position spaced above the bight to thereby solder the legs to the respective metal coatings; severing both legs at points adjacent said first end surface to remove the bight portion and divide the conductor into two separate leads; and severing both legs at points spaced from said other end surface.

5. A method of forming leads on a plurality of electrical components each in a form of a tubular insulating body having metal coatings at the inner and outer surfaces, comprising the steps arranging the bodies spaced apart on an elongated conductor, bending the portions of the conductor between each two adjacent bodies to form a first series of bights spaced at some distance from one end surface of each body and a second series of bights spaced at some distance from the other end surface of each body; dipping the assembly with said first series of bights first into liquid solder while maintaining the bodies in a supported position spaced above said first series of bights to thereby solder the conductor to the metal coatings; severing the conductor at points adjacent said one end surface to remove the first series of bights and severing the conductor at points spaced some distance from said other end surfaces to thereby remove the second series of bights and divide the conductor into a plurality of separate leads each extending from one of said other end surfaces and being soldered to one of said metal coatings.

References Cited in the file of this patent

UNITED STATES PATENTS

| | | |
|---|---|---|
| 2,321,071 | Ehrhardt et al. | June 8, 1943 |
| 2,505,066 | Rulison | Apr. 25, 1950 |
| 2,508,456 | Gustafsson | May 23, 1950 |
| 2,521,661 | Williams | Sept. 5, 1950 |

UNITED STATES PATENT OFFICE
CERTIFICATE OF CORRECTION

Patent No. 2,999,302                                    September 12, 1961

Willem Beukema et al.

It is hereby certified that error appears in the above numbered patent requiring correction and that the said Letters Patent should read as corrected below.

Column 1, line 14, for "sistors and capacitors, to be manufactured in ever smaller" read -- sistors, in the form of a tubular body of dielectric or semi- --; line 19, for "emaller" read -- smaller --.

Signed and sealed this 13th day of February 1962.

(SEAL)
Attest:

ERNEST W. SWIDER                                  DAVID L. LADD
Attesting Officer                                      Commissioner of Patents